United States Patent [19]

Yoshida

[11] Patent Number: 5,353,384
[45] Date of Patent: Oct. 4, 1994

[54] EXPERT SYSTEM
[75] Inventor: Kenichi Yoshida, Kitamoto, Japan
[73] Assignee: Hitachi, Ltd., Tokyo, Japan
[21] Appl. No.: 872,140
[22] Filed: Apr. 22, 1992
[30] Foreign Application Priority Data
Apr. 22, 1991 [JP] Japan .................................. 3-090308
[51] Int. Cl.$^5$ ............................................ G06F 15/18
[52] U.S. Cl. ......................................... 395/51; 395/77
[58] Field of Search ...................... 395/50, 51, 54, 60, 395/75, 77

[56] References Cited

U.S. PATENT DOCUMENTS

| 4,935,876 | 6/1990 | Honatsuka | 395/51 |
| 4,939,680 | 7/1990 | Yoshida | 395/60 |
| 5,043,915 | 8/1991 | Suwa et al. | 395/51 |
| 5,072,406 | 12/1991 | Ammon | 395/77 |
| 5,101,362 | 3/1992 | Simoudis | 395/53 |
| 5,133,063 | 7/1992 | Naito et al. | 395/50 |
| 5,195,026 | 3/1993 | Nonaka et al. | 395/51 |

OTHER PUBLICATIONS

Mitchell et al. "Explanation-Based Generation: A Unifying View" Machine Learning pp. 47-80 1986.

Primary Examiner—Allen R. MacDonald
Assistant Examiner—Stuart B. Shapiro
Attorney, Agent, or Firm—Antonelli, Terry, Stout & Kraus

[57] ABSTRACT

In development of an expert system, there is a problem that when sufficient knowledge is provided for solving a problem, the amount of information to be processed is increased thereby retarding the processing operation, and furthermore descriptive information is not used practically when descriptive information is insufficient and the problem cannot be analyzed sufficiently. In order to solve this problem, there is provided a function of "extracting knowledge required to solve problems within a certain range from detailed knowledge automatically". The expert system includes a first knowledge base for storing detailed knowledge, a second knowledge base for storing compiled knowledge, an inference mechanism for solving a problem by using the second knowledge base, and an analysis mechanism for extracting knowledge having high utilization from the first knowledge base and storing the extracted knowledge in the second knowledge base. The analysis mechanism analyzes a problem solving process example and stores a combination of knowledge which is frequently used as one compiled knowledge and knowledge which is frequently used independently as one compiled knowledge from the first knowledge base into the second knowledge base.

3 Claims, 7 Drawing Sheets

| RULE NUMBER | RULE CONDITION | RULE CONCLUSION |
|---|---|---|
| 1 | If (I1=[H/L]) | Then (Q2=[L/H]) |
| 2 | If (Q1=[H/L]) | Then (V1=[H/L]) |
| 3 | If (V1=[H/L]) & (Vcc=[5V]) | Then (I1=[H/L]) |
| 1 | If (I2=[H/L]) | Then (Q3=[L/H]) |
| 2 | If (Q2=[H/L]) | Then (V2=[H/L]) |
| 3 | If (V2=[H/L]) & (Vcc=[5V]) | Then (I2=[H/L]) |
| 1 | If (I3=[H/L]) | Then (Q4=[L/H]) |
| 2 | If (Q3=[H/L]) | Then (V3=[H/L]) |
| 3 | If (V3=[H/L]) & (Vcc=[5V]) | Then (I3=[H/L]) |
| 1 | If (I4=[H/L]) | Then (Q5=[L/H]) |
| 2 | If (Q4=[H/L]) | Then (V4=[H/L]) |
| 3 | If (V4=[H/L]) & (Vcc=[5V]) | Then (I4=[H/L]) |
| 4 | If (Power=[on]) | Then (Vcc=[5V]) |

FIG. 4

| RULE NUMBER | RULE CONDITION | RULE CONCLUSION |
|---|---|---|
| 5 | If (Q1=[H/L]) & (Power=[on]) | Then (Q2=[L/H]) |
| 5 | If (Q2=[H/L]) & (Power=[on]) | Then (Q3=[L/H]) |
| 5 | If (Q3=[H/L]) & (Power=[on]) | Then (Q4=[L/H]) |
| 5 | If (Q4=[H/L]) & (Power=[on]) | Then (Q5=[L/H]) |

| DATA NUMBER | DATA NAME | DATA VALUE | USED RULE NUMBER | USED DATA | |
|---|---|---|---|---|---|
| 1 | Q1 | [H] | INPUT | | |
| 2 | V1 | [H] | 2 | Q1 | |
| 3 | I1 | [H] | 3 | V1 | Vcc |
| 4 | Q2 | [L] | 1 | I1 | |
| 5 | V2 | [L] | 2 | Q2 | |
| 6 | I2 | [L] | 3 | V2 | Vcc |
| 7 | Q3 | [H] | 1 | I2 | |
| 8 | V3 | [H] | 2 | Q3 | |
| 9 | I3 | [H] | 3 | V3 | Vcc |
| 10 | Q4 | [L] | 1 | I3 | |
| 11 | V4 | [L] | 2 | Q4 | |
| 12 | I4 | [L] | 3 | V4 | Vcc |
| 13 | Q5 | [H] | 1 | I4 | |
| 14 | Vcc | [5V] | 4 | POWER | |
| 15 | POWER | [on] | INPUT | | |

FIG. 8

| DATA NUMBER | DATA NAME | DATA VALUE | USED RULE NUMBER | USED DATA | |
|---|---|---|---|---|---|
| 1 | Q1 | [H] | INPUT | | |
| 2 | Q2 | [L] | 5 | Q1 | POWER |
| 3 | Q3 | [H] | 5 | Q2 | POWER |
| 4 | Q2 | [L] | 5 | Q3 | POWER |
| 5 | Q3 | [H] | 5 | Q4 | POWER |
| 6 | POWER | [on] | INPUT | | |

FIG. 9

| 1 | 3 | 0 | 0 | 0 | 0 | 0 | 0 | 0 | 0 | 0 | 0 |
|---|---|---|---|---|---|---|---|---|---|---|---|
| 2 | 1 | 3 | 0 | 0 | 0 | 0 | 0 | 0 | 0 | 0 | 0 |
| 3 | 4 | 0 | 0 | 0 | 2 | 1 | 0 | 0 | 0 | 0 | 0 |

EXPERT SYSTEM

BACKGROUND OF THE INVENTION

The present invention relates to an expert system, and more particularly to an expert system suitable for utilization in a field in which, when sufficient descriptive information is provided for solving a problem, the amount of information to be processed is increased to retard the processing operation of the information, but the descriptive information is not used practically while when descriptive information is too small and simple since the problem cannot be analyzed sufficiently and the descriptive information is not useful practically. In the latter case, an expert named a knowledge engineer is heretofore required to adjust the level of the descriptive information so as to balance the processing speed and the solving capability of the problem.

In order to improve efficiency of development of the expert system, many methods of learning and preparing technical knowledge using a computer have been proposed. Specifically, in recent years, a method named the explanation based learning has been further studied. For example, Tom M. Mitchell, Richard M. Keller and Smadar T. Kedar-Cabelli, "Explanation-Based Generalization: A Unifying View", Machine Learning 1986, pp. 47–80, describe a method of efficiently solving similar examples after learning by storing a series of applications of knowledge necessary for solving a specific problem.

In the prior art, the series of applications of knowledge necessary for solving a specific problem are stored, so that similar examples that follow after the initial learning can be solved efficiently. However, the prior art has a problem that the problem solving efficiency after the initial learning deteriorates if a human being does not determine what knowledge is necessary for solving the specific problem and does not control to distinguish between knowledge to be learned and knowledge not to be learned.

SUMMARY OF THE INVENTION

In order to solve the above-mentioned problem, it is an object of the present invention to provide a method for automatically judging a series of applications of knowledge to be learned using a computer.

To achieve the above object there is provided an expert system comprising a detailed knowledge base for storing detailed knowledge, a compiled knowledge base for storing compiled knowledge, an inference engine for solving a problem by using the compiled knowledge base, and an analysis mechanism for extracting knowledge having high utilization from the detailed knowledge base to thereby store the knowledge in the compiled knowledge base.

In the expert system according to one feature of the present invention, the analysis mechanism analyzes a solution result of an example problem and stores a combination of knowledge which is frequently used for solving the example problem and knowledge which is frequently used independently from the detailed knowledge base into the compiled knowledge base. More particularly, the analysis mechanism estimates the compiled knowledge base on the basis of the number of inference steps, the amount of data and the amount of knowledge in the compiled knowledge base which are required for the inference engine to solve the example problem using the of contents of the compiled knowledge base and selects knowledge stored in the compiled knowledge base on the basis of the estimated result.

DESCRIPTION OF THE PREFERRED EMBODIMENT

An embodiment of the present invention is now described with reference to the accompanying drawings.

Figure 1:
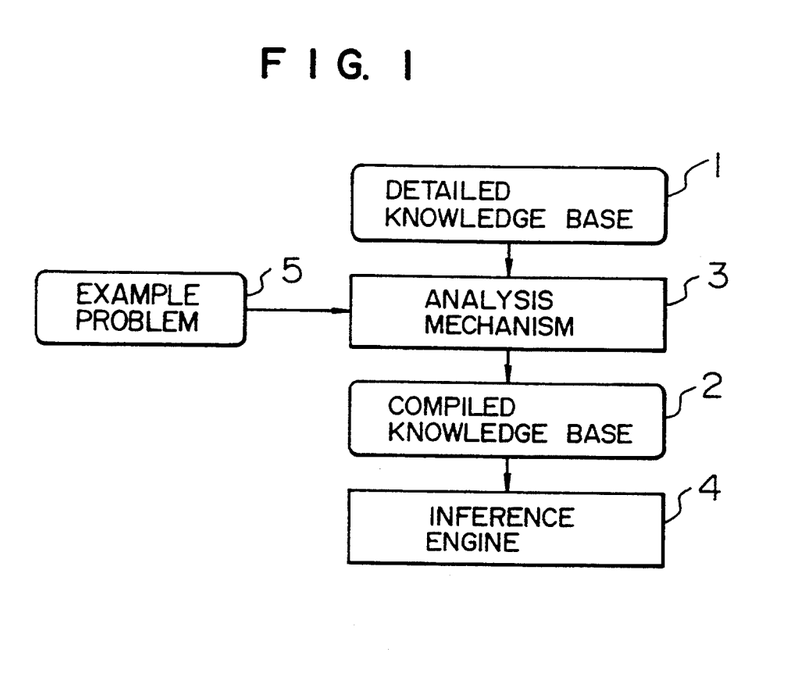
FIG. 1 is a block diagram schematically illustrating a first embodiment of the present invention.

FIG. 1 is a block diagram schematically illustrating a configuration of a representative embodiment of an expert system according to the present invention, Numeral 1 denotes a detailed knowledge base for storing detailed knowledge and which may be a data base stored in a proper computer, 2 denotes a compiled knowledge base for storing compiled knowledge and which may be.also a data base stored in a proper computer, 3 denotes an analysis mechanism for extracting knowledge having high utilization from the detailed knowledge base 1 and storing the extracted knowledge in the compiled knowledge base 2, and 4 denotes an inference engine for solving a problem by using the compiled knowledge base 2 and which may be a program also stored in a proper computer.

In the expert system of the present invention, the analysis mechanism 3 analyzes an example problem 5 and extracts a combination of knowledge which is frequently used to solve the example problem and knowledge which is frequently used independently from the detailed knowledge base 1 to store them in the compiled knowledge base 2. More particularly, the analysis mechanism 3 estimates the compiled knowledge base 2 from the number of inference steps, amount of data and the amount of knowledge in the compiled knowledge base 2 required when the example problem has been solved on the basis of the contents of the compiled knowledge base 2 and selects knowledge stored in the compiled knowledge base 2 on the basis of the estimated result.

The general operation of the expert system according to the present invention is now described with reference to FIG. 15 before preparation of the compiled knowledge base, which is a feature of the present invention, is described more particularly.

Figure 15:
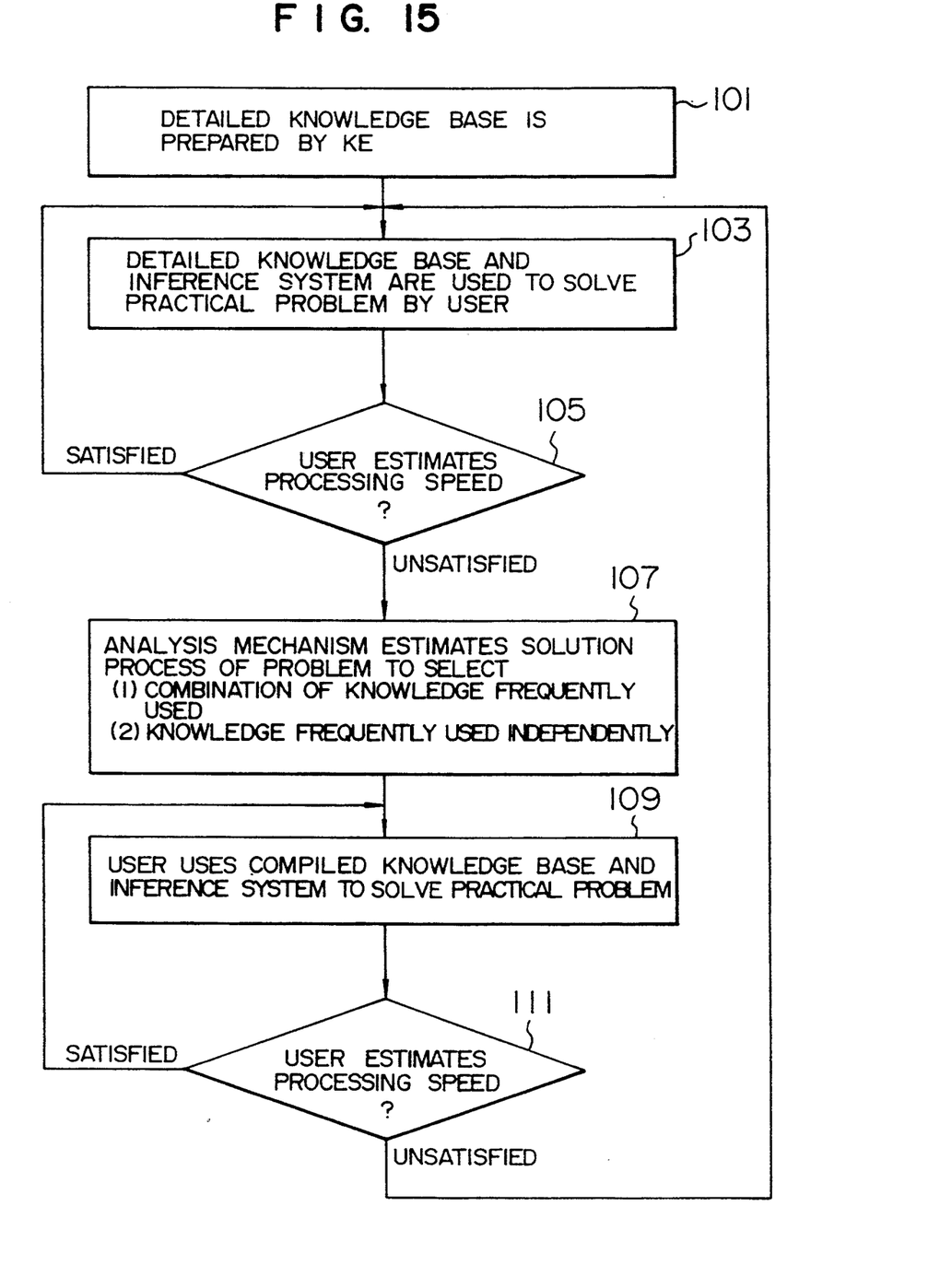
FIG. 15 is a flow chart showing the whole operation of the expert system according to the present invention.

As shown in FIG. 15, the detailed knowledge base is prepared by a knowledge engineer (KE) (step 101). The expert system including the detailed knowledge base and the inference system is used to solve a practical problem by a user (step 103). The user estimates the processing speed of the expert system (step 105). If the user is satisfied with the processing speed, the user continues to use the expert system as it is, but if the user is not satisfied with the processing speed, the analysis mechanism 3 is started. The analysis mechanism 3 estimates the solution process of the problem to estimate (1) a combination of knowledge which is frequently used to solve the problem and (2) knowledge which is frequently used independently to solve the problem in the detailed knowledge base and prepares the compiled knowledge base accordingly (step 107). The user uses the expert system including the compiled knowledge base and the inference system to solve the practical problem (step 109). The user estimates the processing speed of the problem (step 111). If the user is satisfied with the processing speed, the user continues to use the expert system as it is, but if the user is not satisfied with the processing speed, the user causes the expert system including the detailed knowledge base and the inference system to solve the problem and the analysis mechanism 3 to be started to update the compiled knowledge base. Thus, according to the aspect of the present invention, when character or contents of the problem resemble the knowledge stored, the expert system can operate at high processing speed as the system includes the compiled knowledge base and the inference system. But when character or contents of the problem are changed, the expert system including the detail knowledge base and the inference system is operated once, and consequently the processing operation can be operate at a high speed using the expert system including the compiled knowledge base and the inference system.

Figure 2:
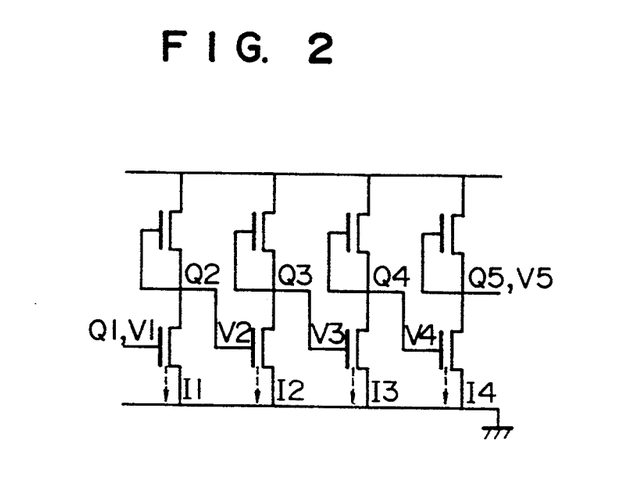
FIG. 2 is a circuit diagram for explaining the present invention.

FIG. 2 is a schematic diagram showing a circuit for explaining the present invention and which includes four logic circuits connected in parallel with each other. In FIG. 2, V1, V2, V3, V4 and V5 represent voltages, Q1, Q2, Q3, Q4 and Q5 represent electric charges stored in terminals (nodes), and I1, I2, I3, I4 and I5 represent currents flowing through pull-down transistors.

Figure 3:
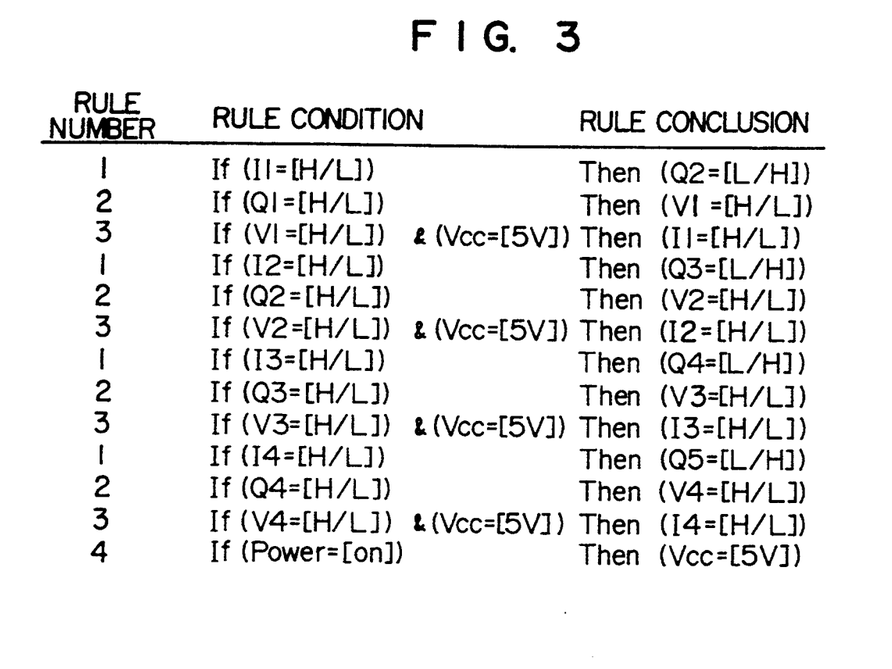
FIG. 3 shows memory contents of a detailed knowledge base relating to the circuit shown in FIG. 2.

FIG. 3 shows memory contents of the detailed knowledge base 1 relating to the circuit shown in FIG. 2. When the logic circuit is observed in detail, the circuit is composed of transistors and capacitors. A rule represented by an "if-then" clause listed in the third row is an inference rule that, when a base voltage of a leftmost transistor is increased, a flowing current is increased (or when the voltage is reduced the current is reduced) and represents a characteristic of a transistor. A first rule listed in the first row represents that electric charges stored in the terminal are increased by a current and the second rule listed in the second row represents a characteristic of a capacitor that a voltage is changed by electric charges. A final rule listed in a final row represents a characteristic relating to a power supply.

Figure 4:
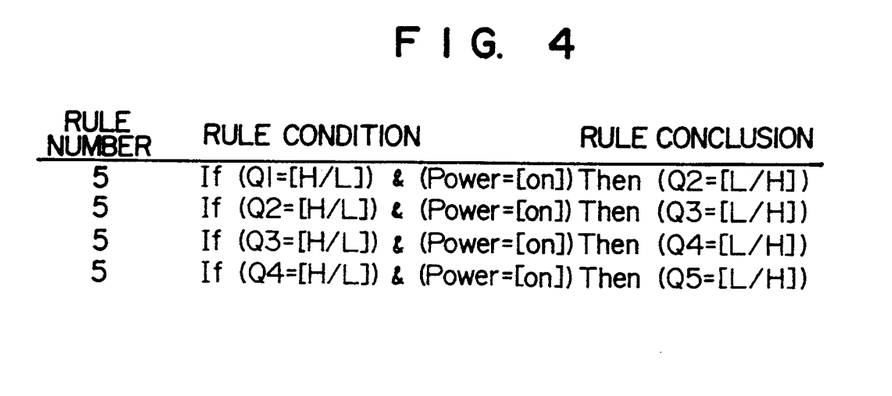
FIG. 4 shows memory contents of a compiled knowledge base relating to the circuit shown in FIG. 2.

FIG. 4 shows memory contents of the compiled knowledge base 2 relating to the circuit shown in FIG. 2. A first rule represented by an "if-then" clause in the first row represents that when electric charges Q1 at the left end are varied, electric charges Q2 at an output of a transistor are varied accordingly.

Figure 5:
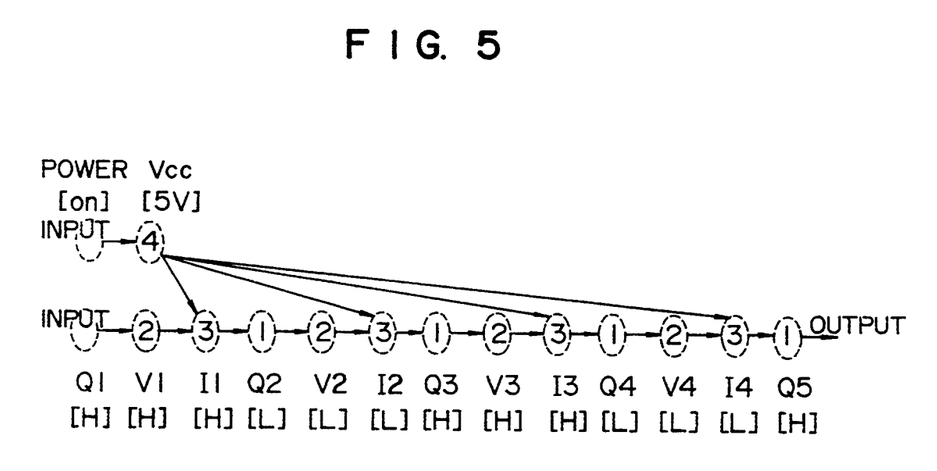
FIG. 5 schematically illustrates an inference process relating the circuit shown in FIG. 2 and performed using the detailed knowledge base 1.

FIG. 5 schematically illustrates an inference process relating to the circuit shown in FIG. 2 and performed using the detailed knowledge base 1 (FIG. 3). An input to this inference process is "increased electric charges at left end (Qi=H)". In this example, the inference is made in which "the increased electric charges Q1 increase the voltage V1 to thereby increase the current flowing through the transistor, so that the electric charges Q2 are reduced. Further, this change is propagated and finally the electric charges Q5 at right end are increased."

Figure 6:
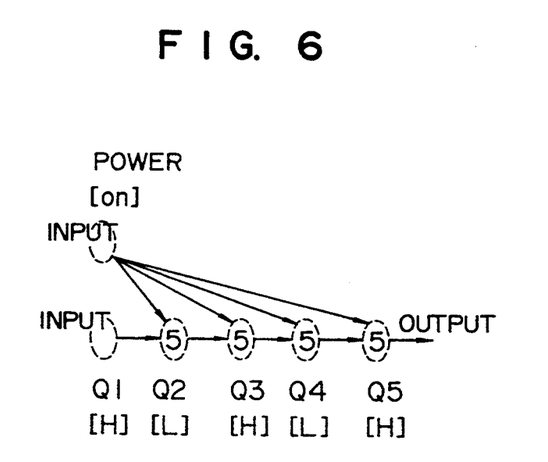
FIG. 6 schematically illustrates an inference process relating to the circuit shown in FIG. 2 and performed using the compiled knowledge base.

FIG. 6 schematically illustrates an inference process relating to the circuit shown in FIG. 2 and performed using the compiled knowledge base 2 (FIG. 4). In this example, the inference is made in which "the increased electric charges Q1 reduce the electric charges Q2 to thereby increase the electric charges Q3, so that the electric charges Q4 are reduced to thereby increase the electric charges Q5."

Figure 7:
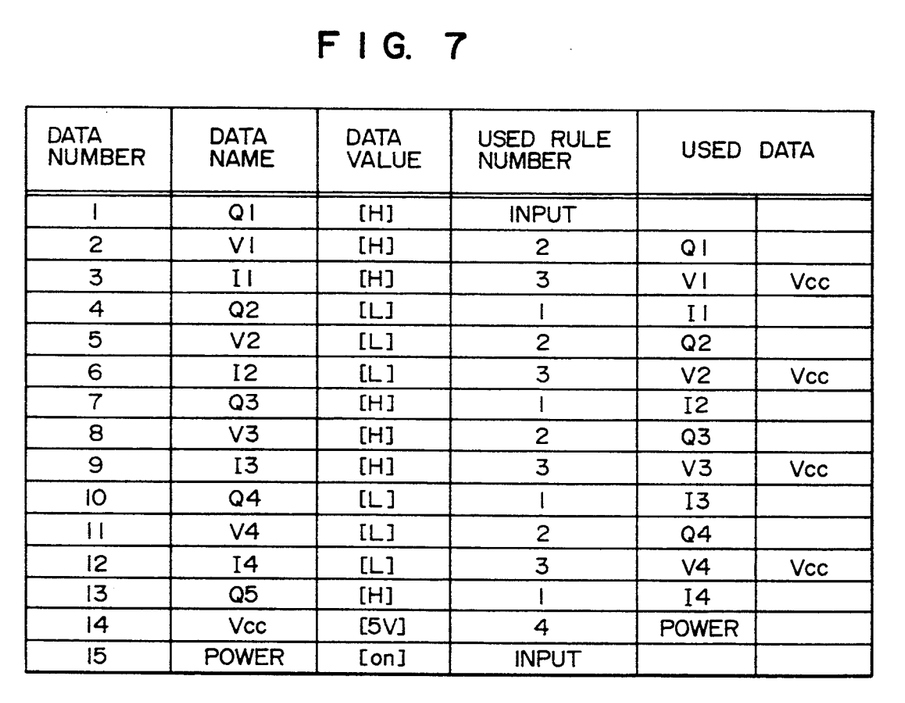
FIG. 7 shows the contents of FIG. 5 in the form of a table.

FIG. 7 shows the contents of FIG. 5 in the form of a table. As shown in FIG. 7, the inference process can easily be stored in the computer by using the form of table. More particularly, in FIG. 7, the data name and data value are the same as the data included in the inference process and are treated as a series of characters in the computer. The used data represents data names used when a value is calculated. In FIG. 7, the data name is stored in the column of the used data for explanation, while the data number may be used as the data names. Generally, the data number is treated in the computer easily as compared with the data name. The used rule number represents the number indicative of a kind of rule used to calculate a value. The rules of calculating values of V1, V2, V3 and V4 in FIG. 3 are the rules representing characteristics of a transistor and are all treated as the same kind of rule. Accordingly, numeral 2 is stored in the associated used rule number column of FIG. 7. Similarly, numeral.1 is stored in the associated used rule number column of FIG. 7 for calculation of Q2, Q3, Q4 and Q5, numeral 3 is stored for calculation of I1, I2, I3 and I4, and numeral 4 is stored for calculation of Vcc.

Figure 8:
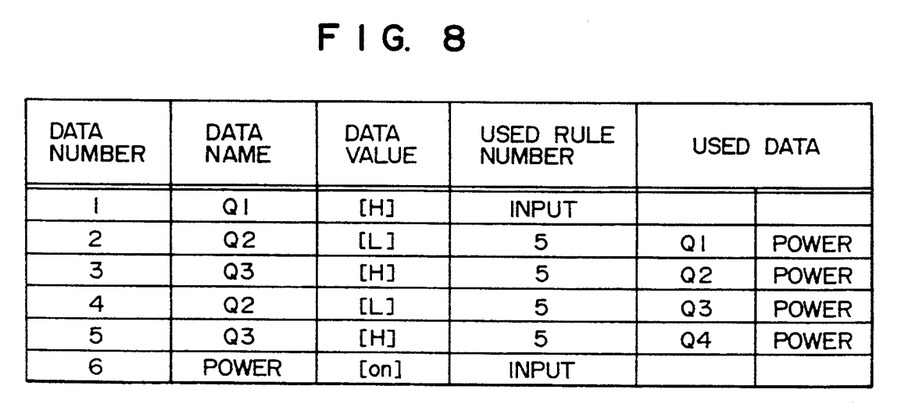
FIG. 8 shows the contents of FIG. 6 in the form of a table.

FIG. 8 shows the contents of FIG. 6 in the form of a table.

As apparent from comparison of FIGS. 3, 4, 5, 6, 7 and 8, the amount of associated data and the amount of rules used in the inference using the compiled knowledge base 2 are both reduced as compared with the inference using the detailed knowledge base 1 and the inference using the compiled knowledge base 2 can be performed at high speed with small memory capacity. Operation of the analysis mechanism 3 which prepares the compiled knowledge base 2 from the detailed knowledge base 1 is now described with reference to FIG. 9.

The analysis mechanism 3 is supplied with the problem example 5 and prepares the inference process shown in FIG. 5 using the detailed knowledge base 1. The example problem 5 in this case is that "when the power supply is "on" and the electric charge Q1 is "H", i.e. at a logical "high", what is the electric charge Q5?" Now, "L" denotes a logical "low".

Figure 9:
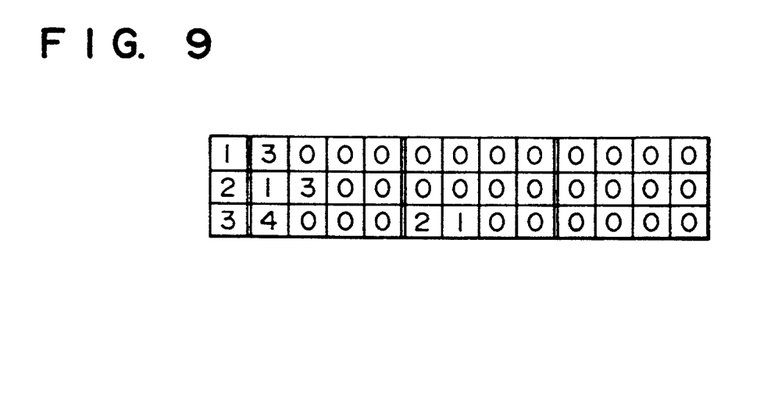
FIG. 9 shows memory contents used in a selection method.

The analysis mechanism 3 then rewrites the inference process in accordance with memory contents of the selection method shown in FIG. 9. The rewriting is made by rewriting a series of rules as a new rule when the series of rules shown in the selection method appears in the inference process.

Figure 10:
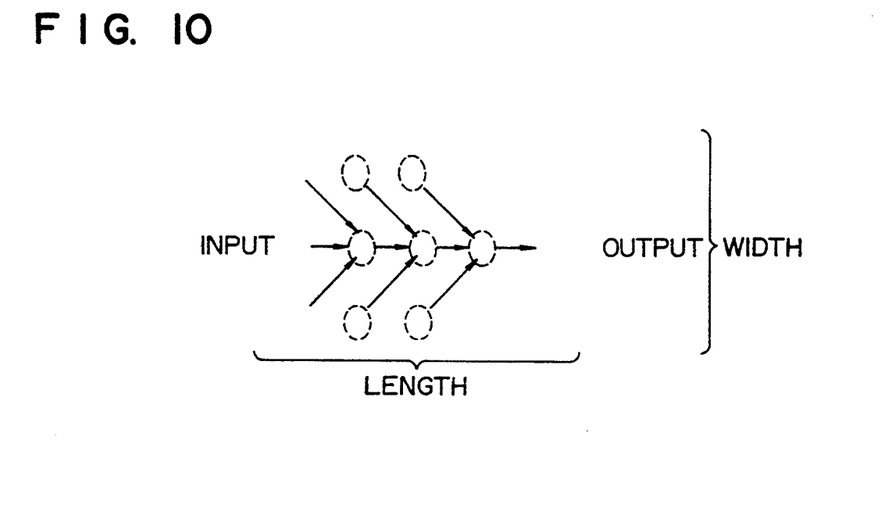
FIG. 10 schematically illustrates meaning of terms used in FIG. 9.

The memory contents of the selection method shown in FIG. 9 represent the series of rules included in the inference process having a length 3 and a width 3. The length and the width are schematically illustrated in FIG. 10. The memory contents of the selection method having the length of N and the width W include W series of rules having the length N-1 and the width W following the number of the rule finally used and have a length of F(N, W), where $$F(N,W) = 1 + W * F(N - 1, W) \ldots \text{if } N > 1$$
$$= 1 \qquad\qquad\qquad \ldots \text{if } N = 1$$

There is a case where values of N and W are different depending on the problem.

0 means any rule. The first row of the memory contents of the selection method shown in FIG. 9 represents that "if a rule 3 is used just before a rule 1, the series of rules is replaced by a new rule", the second row represents that "if the rule 1 is used just before a rule 2 and the rule 3 is used just before the rule 1, the series of rules is replaced by another new rule", and the third row represents that "if rules 4 and 2 are used just before the rule 3 and the rule 1 is used just before the rule 2, the series of rules is replaced by another new rule".

The inference process of FIG. 6 is obtained by rewriting the inference process of FIG. 5 by the selection method of 1342000000000. While 0 means any rule, it is not rewritten. For example, when there is a series of rules corresponding to 1342010000000, a portion of 1342 is rewritten and a remaining portion including 1 is not rewritten.

There is no rule corresponding to the "knowledge which is frequently used independently" in the above example, while the rule which is not rewritten by the analysis mechanism 3 and remains as it is corresponds to the "knowledge which is frequently used independently". The knowledge which is frequently used independently is now described simply in a slightly modified circuit of the above-described example. A circuit to be processed is, for example, as shown in FIG. 12 and the inference process attained by the detailed knowledge base 1 is shown in FIG. 13.

Figure 12:
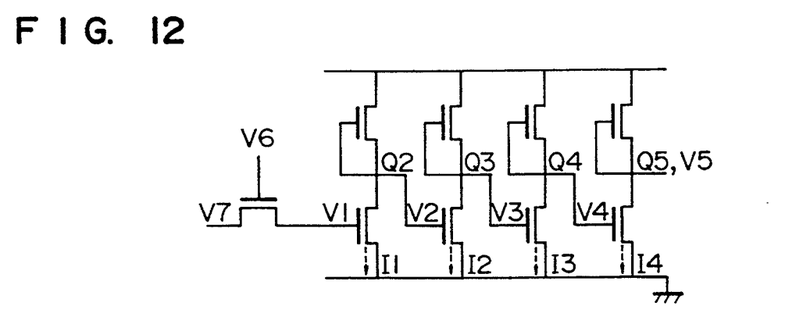
FIG. 12 is a schematic diagram of another circuit for explaining the present invention.
Figure 13:
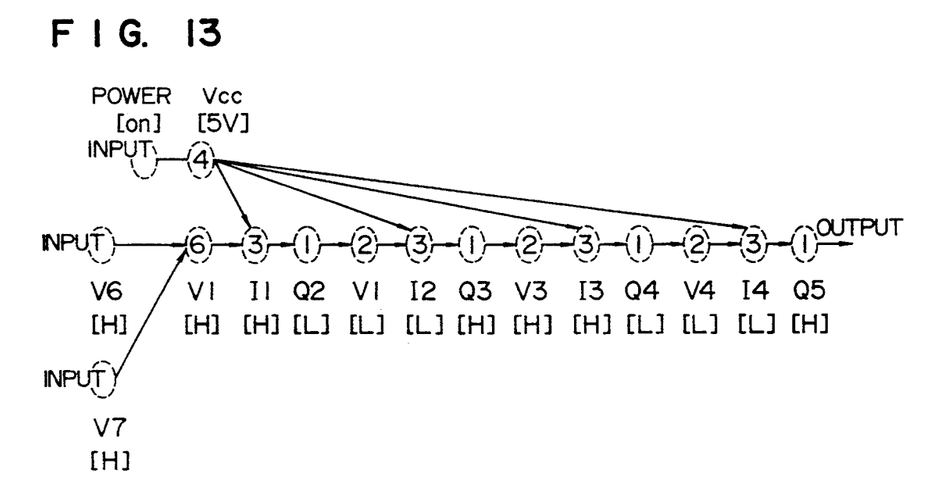
FIG. 13 schematically illustrates an inference process relating to the circuit shown in FIG. 12 and performed using the detailed knowledge base.
Figure 14:
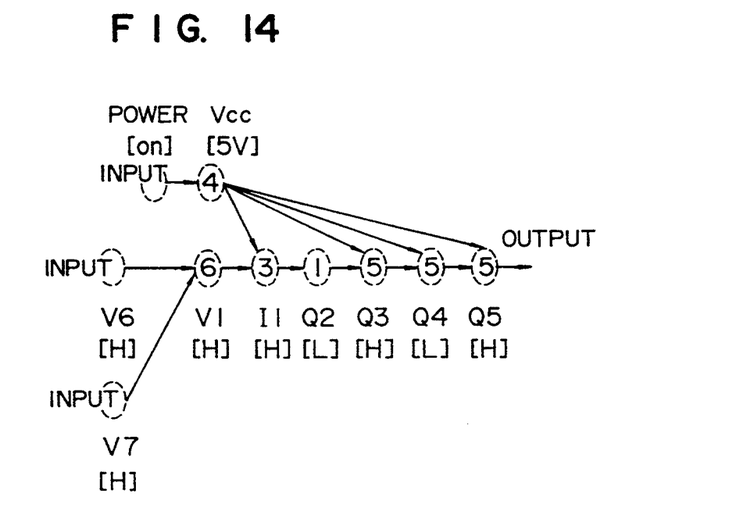
FIG. 14 schematically illustrates an inference process relating to the circuit shown in FIG. 12 and performed using the compiled knowledge base.

The circuit shown in FIG. 12 includes a passage control transistor connected to the input of the circuit shown in FIG. 2 to supply an input signal to the circuit of FIG. 2 through the passage control transistor. The inference process shown in FIG. 13 is different from the inference process shown in FIG. 5 in that the voltage 1 inferred by the inference rule 2 indicative of the characteristic of a capacitor is inferred using an inference rule 6 indicative of the characteristic of the passage control transistor. FIG. 14 shows the inference process attained by the compiled knowledge base 2 obtained by processing with the same selection method of 342000000000 as that utilized to derive FIG. 2 from FIG. 5. In FIG. 14, 6, 3 and 1 are the rule corresponding to the "knowledge which is frequently used independently".

The analysis mechanism 3 changes the memory contents of the selection method with the following method and rewrites the inference process with the changed selection method. The analysis mechanism 3 then selects the selection method having a reduced amount of the number of inference steps, the amount of data and the amount of rules after rewriting in the rewritten inference process and stores the rules included in the inference process after rewriting in the compiled knowledge base 2. The. number of inference steps, the amount of data and the amount of rules after rewriting can be calculated simply by searching the tables of FIGS. 7 and 8 indicative of the contents.

Change method 1: L selection methods are combined to prepare a new selection method. The selection method obtained by the combination can be stored with an array having a length of L*F(N,W). The selection method shown in FIG. 9 is used for one kind of rewriting, whereas the selection method obtained by this method is used for L kinds of rewriting.

Change method 2: Memory contents of the selection method are rewritten to prepare a new selection method. The rewriting may be selected at random or may be changed to make equal to a combination which is actually present in the table of FIG. 7 indicative of the contents. For example, when the selection method at the uppermost row of FIG. 9 is changed, numerals at any position may be rewritten, or, since the series of rules indicating that rule 2 is used after rules 1 and 3 have been used is found if the table of FIG. 7 is searched, the selection method at the second row may be prepared.

Change method 3: The above change methods are combined to prepare a new selection method.

An initial value of the selection method may be all 0. Accordingly, the analysis mechanism 3 according to the present invention changes the selection method having all 0 by means of the above method and rewrites the inference process prepared using the detailed knowledge base 1 according to the changed selection method. Further, the analysis mechanism 3 estimates the rewritten inference process on the basis of the number of inference steps, the number of data and the number of rules after rewriting and repeats the rewriting operation to prepare the selection method exemplified in FIG. 9 and finally prepare the selection method 1342000000000. In this case, since the selection method 1342000000000 has a minimized the number of inference steps, the amount of data and the amount of rules after rewriting as compared with other selection methods, the rules included in the inference process obtained by rewriting with the selection method are stored in the compiled knowledge base 2. In this case, the rules stored in the compiled knowledge base 2 are as shown in FIG. 4.

Figure 11:
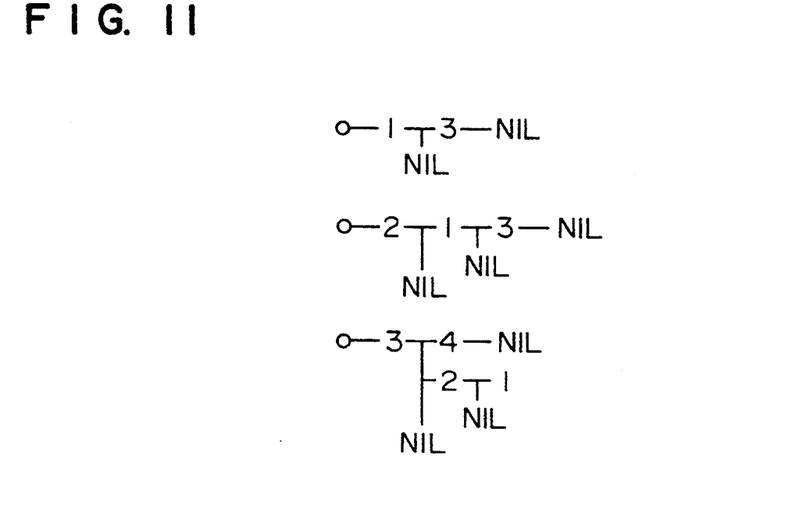
FIG. 11 schematically illustrates the contents of FIG. 9 in a list structure.

The above embodiment uses the data structure in the form of a table as the memory method of the selection method in order to describe a simple implementation method in a computer. This method can be implemented simply but has a drawback whereby the amount of data is increased. If a computer language for list processing such as LISP which is widely used in recent years is utilized, data having the same capacity can be stored with a reduced memory capacity and accordingly a structure having high memory efficiency such as the list structure may be used for implementation in a computer system. When the list structure is utilized, the contents of FIG. 9 are as shown in FIG. 11.

In the above embodiment, the analysis mechanism 3 selects the selection method having the reduced sum of the number of inference steps, the amount of data and the amount of rules after rewriting in the inference process obtained by rewriting and prepares the compiled knowledge base 2, while any function may be used instead of the sum. Further, data other than the number of inference steps, the amount of data and the amount of rules after rewriting may be utilized.

As apparent from the above embodiment, according to the present invention, the compiled knowledge base having a combination of knowledge with which the number of inference steps, the amount of data and the amount of knowledge in the compiled knowledge base required to solve the problem are reduced can be prepared.

In the present invention, since the problem is solved by utilizing the compiled knowledge base, the processing speed is high, and in order to prepare the compiled knowledge base, the problem example is used to collect suitable knowledge from the detailed knowledge automatically by the computer and accordingly the compiled knowledge base can be prepared.

Many different embodiments of the present invention may be constructed without deparitng from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An expert system, comprising:
a detailed knowledge base for storing detailed knowledge and knowledge that is frequently used independently;
an anlysis mechanism for extracting knowledge having high utilization from said detailed knowledge base and outputting said extracted knowledge;
a compiled knowledge base for storing said extracted knowledge from said analysis mechanism as compiled knowledge; and
an inference engine for obtaining said compiled knowledge from said compiled knowledge base for solving an example problem;
wherein said analysis mechnaism analyzes a problem solving process example and stores, based solely on said analysis, a combination of said detailed knowledge having high utilization used to solve said example problem and said knowledge which is frequently used independently from said detialed knowledge base into said compiled knowledge base.

2. An expert system, comprising:
a detailed knowledge base for storing detailed knowledge and knowledge that is frequetly used indpendently;
an analysis mechanism for extracting knowledge having high utilization from said detailed knowledge base and outputting said extracted knowledge;
a compiled knowledge base for storing said extracted knowledge from said analysis mechanism as compiled knowledge; and
an inference engine for obtiaing said compiled knowledge from said compiled knowledge base for solving an example problem;
wherein said analysis mehcnaism analyzes a problem solving process example and stores a combiantion of said detailed knowlege having high utilization used to solve said example problem and said knowledge which is frequently used independently from said detailed knowledge base into said compiled knowledge base, and
wherein further said analysis mechanism estimates a number of inference steps to solve said example problem and the amount of data and the amount of knowledge in said compiled knowledge base, and selects knowledge stored in said compiled knowledge base on the basis of the estimation result to thereby reduce said estimated number of inference steps and amounts of data and knowledge.

3. An expert system according to claim 2, wherein said analysis mechanism selects knowledge stored in said compiled knowledge base using one of a plurality of selection methods, said one selection method when used reduces said estimated number of inference steps and amounts of data dn knowledge, further, siasd one selection method is modifed by combining at least one other of said selection methods or by rewriting memory contents of said one selection mehtod.

* * * * *